(12) United States Patent
Bolle

(10) Patent No.: US 6,755,219 B1
(45) Date of Patent: Jun. 29, 2004

(54) METHOD AND APPARATUS FOR SUPPLYING FUEL FOR A HYDROGEN-OPERATED VEHICLE

(75) Inventor: Dirk Bolle, Bonn (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 10/655,232

(22) Filed: Sep. 4, 2003

(30) Foreign Application Priority Data

Aug. 26, 2003  (DE) ......................................... 103 39 548

(51) Int. Cl.⁷ ............................................... B65B 1/04
(52) U.S. Cl. ........................... 141/9; 141/100; 141/114; 141/59; 220/86.2
(58) Field of Search .......................... 141/9, 100, 114, 141/65, 59; 220/86.2

(56) References Cited

U.S. PATENT DOCUMENTS 3,477,611 A * 11/1969 Niles ......................... 220/86.2
5,701,928 A * 12/1997 Aoki ........................... 137/312
6,443,192 B1 * 9/2002 Erwin et al. .................. 141/65
6,681,811 B2 * 1/2004 Channing ...................... 141/9

\* cited by examiner

*Primary Examiner*—Steven O. Douglas
(74) *Attorney, Agent, or Firm*—Grossman Tucker Perreault & Pfleger, PLLC

(57) ABSTRACT

Described are a method of and an apparatus for supplying fuel for a motor vehicle comprising at least one hydrogen consumer wherein the hydrogen is liberated by catalytic reaction of a hydrogen donor provided as the fuel and recyclable fuel which has reacted in that operation is produced. The method comprises taking unreacted fuel from a first storage volume, filling at least one second storage volume separate from the first storage volume with reacted fuel and at least partially additionally using the first storage volume which has become vacant by virtue of unreacted fuel being taken therefrom, for storage of the reacted fuel. A fuel container arrangement includes at least one storage container for unreacted fuel and communicating with a removal container for supplying the fuel to the reaction, and a collecting container communicating with a storage container, when vacated of unreacted fuel, by way of a flow transfer conduit for transferring reacted fuel to the storage container.

17 Claims, 10 Drawing Sheets

US 6,755,219 B1

METHOD AND APPARATUS FOR SUPPLYING FUEL FOR A HYDROGEN-OPERATED VEHICLE

FIELD OF THE INVENTION

The invention relates to a method and an apparatus for supplying fuel for a hydrogen-operated vehicle.

BACKGROUND OF THE INVENTION

In the context of supplying fuel to a vehicle driven by means of a hydrogen fuel cell the hydrogen which is required for the fuel cell can be carried and stored in the vehicle in its pure form. As an alternative thereto the fuel can be produced by a chemical or catalytic reaction while the vehicle is actually in operation. That manner of proceeding affords advantages which are relevant in safety terms. A known procedure in that respect is for example the process which is referred to as the sodium borohydride reaction. In that procedure sodium borohydride ($NaBH_4$) in aqueous solution is provided as the fuel. The sodium borohydride is fed to a catalyst unit which liberates pure hydrogen and sodium borate ($NaBO_2$) in aqueous solution. The technically pure hydrogen can then be fed directly to a fuel cell connected on the downstream side of the catalyst unit. In the fuel cell hydrogen is reacted together with atmospheric oxygen to form water, more specifically with electrical energy being produced for a drive motor of the vehicle. The sodium borate which is produced in the catalytic reaction of the sodium borohydride can be recycled again by means of a suitable process to form sodium borohydride. It is therefore appropriate and desirable for the sodium borate which has been produced by the reaction to form the fuel for the fuel cell to be collected in a collecting container provided for that purpose in the vehicle.

It will be noted here that in the present specification the term reacted fuel may be used for brevity to denote the fuel component which is present after the catalytic reaction of the hydrogen donor that liberates the hydrogen for example for a fuel cell, and could thus also be referred to as post-reaction fuel.

If the usual volume of a fuel tank of a motor vehicle is employed for storing the fuel then the range of the vehicle, as measured on the basis of the available supply of fuel, is comparatively short in comparison with a motor vehicle fitted with an internal combustion engine burning a hydrocarbon fuel. In addition, when using the sodium borohydride catalysis procedure it is additionally necessary to provide a suitable storage volume for the reacted fuel, that is to say, as noted above, the sodium borate which has been produced after the catalytic reaction of the sodium borohydride. That storage volume will generally be to the detriment of the overall useful or payload volume of the vehicle.

So that the volume in the vehicle which is available for fuel storage can be utilised as effectively as possible, it is desirable for the unreacted fuel, that is to say the sodium borohydride, to be afforded in as concentrated a form as possible. Sodium borate precipitates out at levels of concentration of more than 20% by weight in aqueous solution so that it is appropriate for sodium borohydride to be fed to the catalyst unit at a concentration of 20% by weight in aqueous solution. If therefore sodium borohydride is to be stored in aqueous solution at a higher level of concentration then water should be added to the solution before it passes into the catalyst unit. For that purpose, connected upstream of the catalyst unit is a mixer which is operable to provide the sodium borohydrlde solution at the desired degree of dilution for the catalyst unit. In that situation the water which is fed to the mixer is taken from the waste gas flow from the fuel cell. Water vapor contained in the waste gas is condensed out in a condenser and fed to the mixer. When adopting that form of fuel preparation, for example when using 100 l of a 30% sodium borohydride solution as the unreacted fuel, about 115 l of 20% sodium borate solution is produced as the reacted fuel. In such a situation a particularly large volume is required for collecting and storing the reacted fuel. That is to the detriment either of the range of the vehicle or the useful or payload volume of the vehicle.

SUMMARY OF THE INVENTION

An object of the present invention is to provide a method of supplying fuel for a vehicle operated by a hydrogen consumer such as a fuel cell, which makes it possible to achieve an adequate supply of fuel for a sufficient vehicle range while involving the smallest reasonable reduction in useful volume in the vehicle.

Another object of the invention is to provide a method of supplying fuel in a vehicle driven by a hydrogen consumer such as a fuel cell, which is designed to afford a reasonably sufficient range of operation for the vehicle without entailing excessive bulk.

Still another object of the present invention is to provide an apparatus for supplying a fuel cell with fuel in a vehicle driven by a motor operated by the fuel cell, which makes it possible to put an available fuel storage volume to a better and more viable use.

In accordance with the principles of the present invention in the method aspect the foregoing and other objects are attained by a method of supplying fuel for a motor vehicle comprising at least one oxygen consumer, for example a fuel cell, in which hydrogen is converted into electrical energy, the hydrogen being liberated by catalytic reaction of a hydrogen donor provided as the fuel, resulting in the production of recyclable reacted fuel. Unreacted fuel is taken from a first storage volume and at least one second storage volume which is separate from the first storage volume is filled with reacted fuel. The first storage volume which has become vacant by virtue of unreacted fuel being removed therefrom is at least partially additionally used for storage of the reacted fuel.

As will be seen in greater detail from the description hereinafter of preferred embodiments of the invention, the present invention is based on the notion of using at least a partial volume of the storage volume originally provided for the storage of unreacted fuel, after the removal of fuel therefrom, for the storage of reacted fuel. Such an operating procedure means that the volume required overall for storage of unreacted fuel and for storage of reacted fuel can be reduced to an optimum degree.

In accordance with a preferred feature of the method of the invention, in order to make optimum use of the structural space available in the context of a vehicle operated by for example a hydrogen fuel cell, it may be advantageous to use a plurality of spatially mutually separated containers or tanks as storage volumes for storing the fuel.

In accordance with another preferred feature of the method of the invention at least three series-connected containers are employed as storage volumes, wherein the unreacted fuel is taken from a first container, which can be referred to as a removal container insofar as the unreacted fuel is removed therefrom, wherein the removal container is fed with unreacted fuel from at least one storage container, wherein at least one collecting container is filled with reacted fuel and wherein the reacted fuel is transferred from the collecting container into the storage container or containers when the unreacted fuel has been completely withdrawn from the latter.

It will be easily appreciated that the removal container is not available for filling with reacted fuel as it is necessary to ensure that the vehicle can continue in operation until it is refilled with fuel. Furthermore the volume of the collecting container cannot be filled or refilled with unreacted fuel as reacted fuel is already produced Immediately after the commencement of operation of the vehicle and that reacted fuel must be suitably collected.

As will be described in greater detail hereinafter, it is desirable for the number and size of the containers which are to be provided to be optimised in regard to the amount of reacted fuel produced in relation to the amount of unreacted fuel involved. If about 115% of reacted fuel is produced for 100% of unreacted fuel the use of a total of five fuel containers has proven to be particularly advantageous in terms of carrying the method of the invention into effect.

In the apparatus aspect the foregoing and further objects of the invention are attained by a fuel container for the fuel supply for a vehicle with at least one hydrogen consumer such as a fuel cell in which hydrogen is converted into electrical energy, the hydrogen being liberated by catalytic reaction of a hydrogen donor as the fuel, with the resulting production of recyclable reacted fuel. The fuel container includes at least one filling and/or emptying opening, and at least one fuel withdrawal conduit, wherein the container has first and second mutually separate volumes for reacted and unreacted fuel, the division of said volumes being such that upon filling of a said volume said volume is expandable at the expense of the respective other volume.

In accordance with a preferred feature of the apparatus aspect of the invention the fuel container may have for example first and second chambers, with the chambers being separated from each other by a flexible wall. In that case the chambers are each of a variable volume, wherein a respective chamber can be enlarged to the detriment of the volume of the respective other chamber by virtue of the flexible wall separating the chambers.

In another preferred feature the flexible wall can be clamped peripherally in liquid-tight and gas-tight relationship in the region of a peripherally extending container seam. For example the fuel container may comprise first and second casing portions which for example comprise plastic material and are welded together in the region of a peripherally extending connecting flange arrangement. The flexible wall can then also be welded in position at the seam location of the casing portions of the container.

As an alternative thereto, a further preferred feature of the invention provides that the container constitutes an outer container forming a main volume, and disposed within the container is a flexible inner container of a volume which is variable at the expense of the main volume formed by the outer container, with the flexible inner container being fluid-tightly and gas-tightly separated from the main volume. In such an arrangement for example the flexible inner container may be in the form of a bag, for example of a suitable film or foil material, which can expand into the main volume of the outer container as it is progressively vacated when fuel is increasingly drawn from the container.

The foregoing and other objects of the invention are further attained by a fuel container arrangement for the fuel supply for a motor vehicle having at least one hydrogen consumer such as a fuel cell in which hydrogen is converted into electrical energy, wherein the hydrogen is liberated by a catalytic reaction of a hydrogen donor provided as the fuel, with the production of recyclable reacted fuel, the fuel container arrangement including at least one removal container from which fuel can be taken, the removal container being provided with means for conveying the fuel therefrom, at least one storage container communicating with the removal container and provided for means for conveying the fuel into the removal container, and at least one collecting container communicating with a storage container by way of a flow transfer means.

In a preferred feature of this arrangement the storage container is connected to the removal container and to the collecting container by way of a switchable multiway valve, thereby to ensure that the storage container can be used either for receiving reacted fuel or for receiving and delivering unreacted fuel.

In another preferred feature the fuel container arrangement has at least two further storage containers which respectively communicate by way of switchable valves with the removal container and the collecting container. As has been indicated hereinbefore it has been found at this time that a container arrangement comprising a total of five containers constitutes an optimum in terms of utilising the overall volume required.

Preferably the storage containers feed the removal container by way of respective suction jet pumps which are each driven by way of a return flow of fuel from the removal container.

The return flow for example can be branched from a removal conduit for drawing fuel from the removal container.

In a further preferred feature the storage containers are respectively connected to a common return conduit from the removal container and to a common feed conduit to the removal container.

A further preferred feature provides that the return conduit can be connected to the removal conduit by way of a pressure regulating valve. In that case, the volume flow of fuel which is delivered by the pump and which does not have to be fed to the catalyst unit is fed into the return conduit by way of appropriate operation of the pressure regulating valve.

It may be particularly advantageous for the size of the collecting container and the storage containers to be respectively such that the container which is disposed upstream in the direction of delivery of the fuel can receive the volume of reacted fuel which is produced upon emptying of the downstream-connected container with unreacted fuel and processing thereof.

It will be noted at this juncture that the term emptying in the sense as used hereinbefore denotes emptying for example for the disposal of the reacted fuel.

In a preferred feature the removal container and the storage container can each be connected to a common filling conduit while the collecting containers and the storage containers can each be connected to a common emptying conduit.

Alternatively, filling and emptying of the fuel container arrangement can be implemented by way of a common conduit.

Further objects, features and advantages of the invention will be apparent from the description hereinafter of preferred embodiments of the invention.

DESCRIPTION OF PREFERRED EMBODIMENTS

Figure 1:
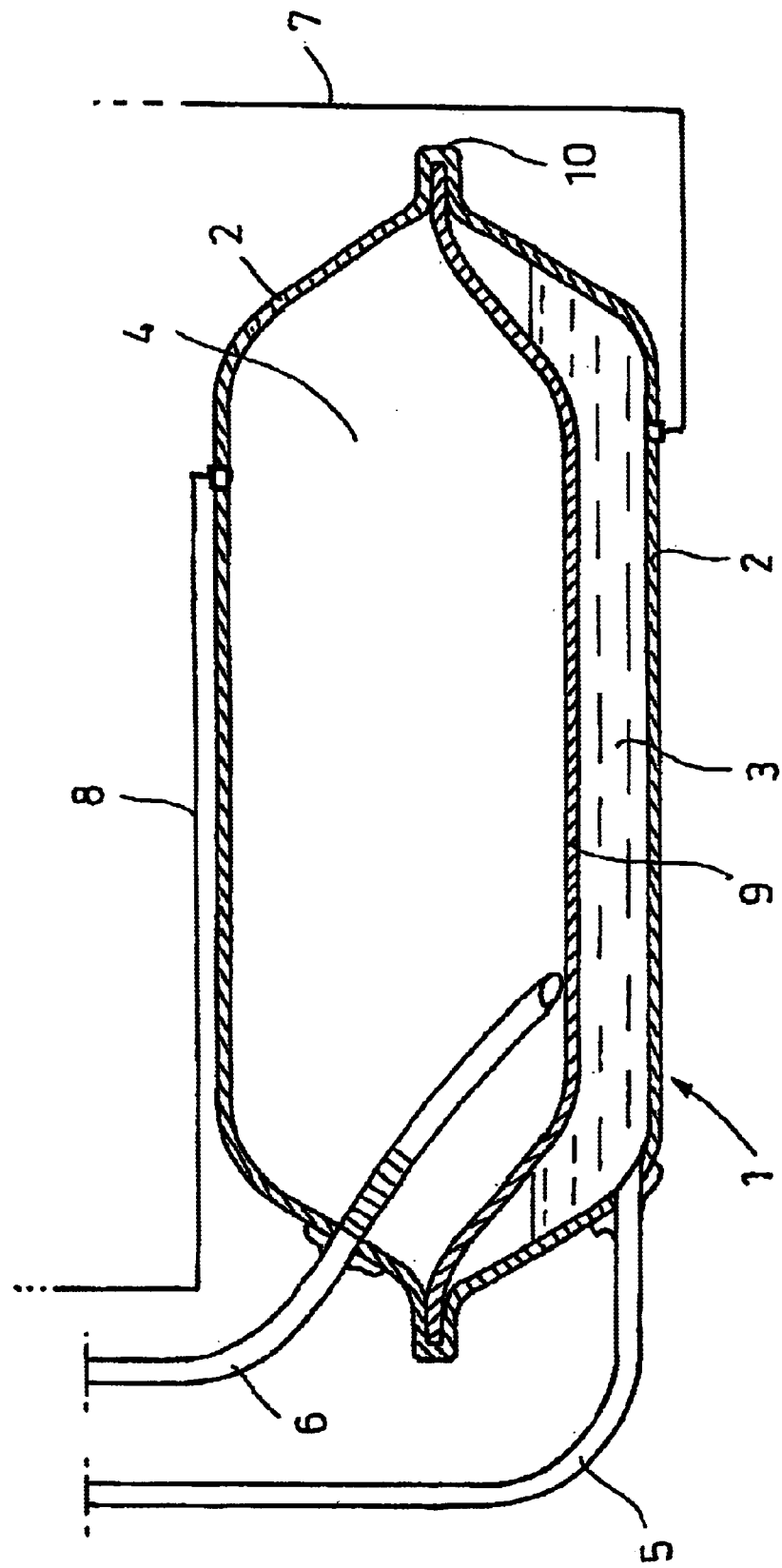
FIG. 1 is a diagrammatic view of a first embodiment of a fuel container in accordance with the invention.

Referring firstly to FIG. 1, shown therein is a fuel container 1 according to the invention, in the form of a plastic container which is formed from two casing portions 2 and which defines a first lower storage volume 3 and a second upper storage volume 4. The first storage volume 3 serves to accommodate unreacted fuel for a vehicle provided with a hydrogen consumer such as a hydrogen fuel cell. In the illustrated embodiment herein the fuel involved is an aqueous solution with a 30% sodium borohydride concentration ($NaBH_4$). As has already been indicated above, the sodium borohydride solution as the unreacted fuel is fed by way of a mixer to a catalyst unit (not shown) in which sodium borohydride is reacted to form sodium borate ($NaBO_2$), with the liberation of hydrogen for the hydrogen fuel cell. The sodium borate as reacted fuel, or as post-reaction fuel, is collected and stored in the second storage volume 4 of the container 1.

Reference numeral 5 denotes a filling conduit which is connected to the first storage volume 3 while reference numeral 6 denotes an emptying conduit connected to the second storage volume 4. The end of the emptying conduit 6 which extends into the storage volume 4 is flexible so that complete emptying of the storage volume 4 is possible before the storage volume 3 is filled with unreacted fuel.

Reference numeral 7 denotes a take-off or removal conduit by way of which the unreacted fuel in the first storage volume 3 can be circulated through a catalyst unit by way of a pump (also not shown). The reacted fuel is returned to the second storage volume 4 by way of a return conduit 8.

It will be seen that the storage volumes 3 and 4 are separated in fluid-tight and gas-tight relationship from each other by a flexible separating wall 9.

FIG. 1 shows a fuel container filling situation in which the first storage volume 3 is being filled with unreacted fuel. As can be seen therefrom, the area of the separating wall 9 is such that, when the fuel container 1 is unfilled, the separating wall 9 hangs down in the direction of the force applied thereto by its own weight, in other words, its area is larger than the area corresponding to the separation plane of the casing portions 2. It should be noted at this point that the fuel container can also be in the form of a one-piece plastic container produced for example by blow molding.

Figure 2:
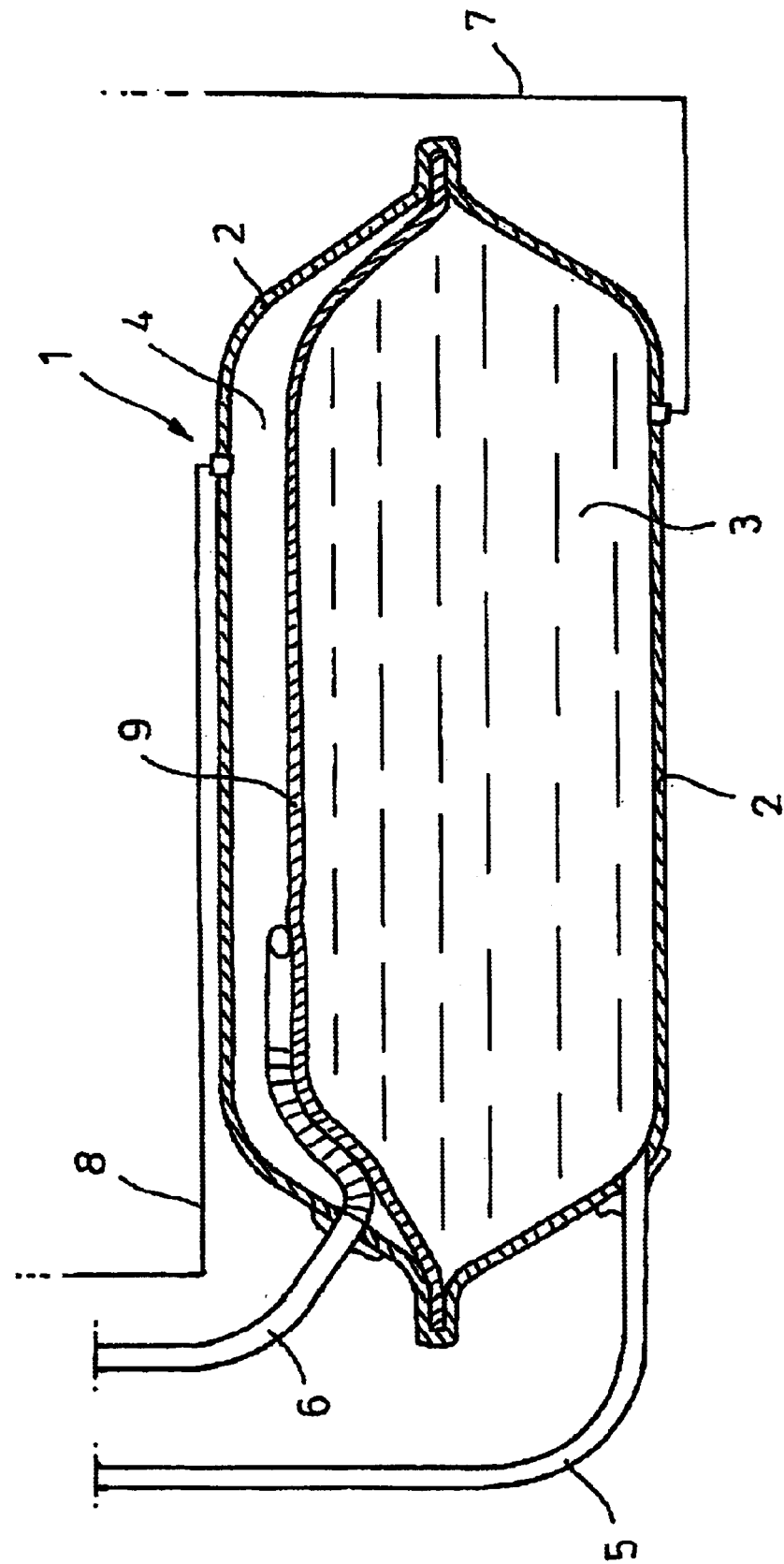
FIG. 2 is a diagrammatic view of the fuel container of FIG. 1 in the filled condition.

At its periphery the separating wall 9 is clamped in position in fluid-tight and gas-tight relationship in the region of a peripherally extending flange 10 on the fuel container 1. If now the level of liquid in the first storage volume 3 rises, as is illustrated in FIG. 2, the separating wall 9 is lifted by the surface of the liquid as it rises. FIG. 2 shows the container 1 with the first storage volume 3 in the completely filled condition. As, in the sodium borohydride catalysis procedure as referred to hereinbefore, in the illustrated embodiment, approximately 15% more reacted fuel is produced than unreacted fuel was used, it is not possible to make use of the entire volume of the fuel container 1 when filling it with the unreacted fuel, but rather it is necessary to leave a free space, the size of which approximately corresponds to the increase in the volume of reacted fuel over the volume of the unreacted fuel.

Figure 3:
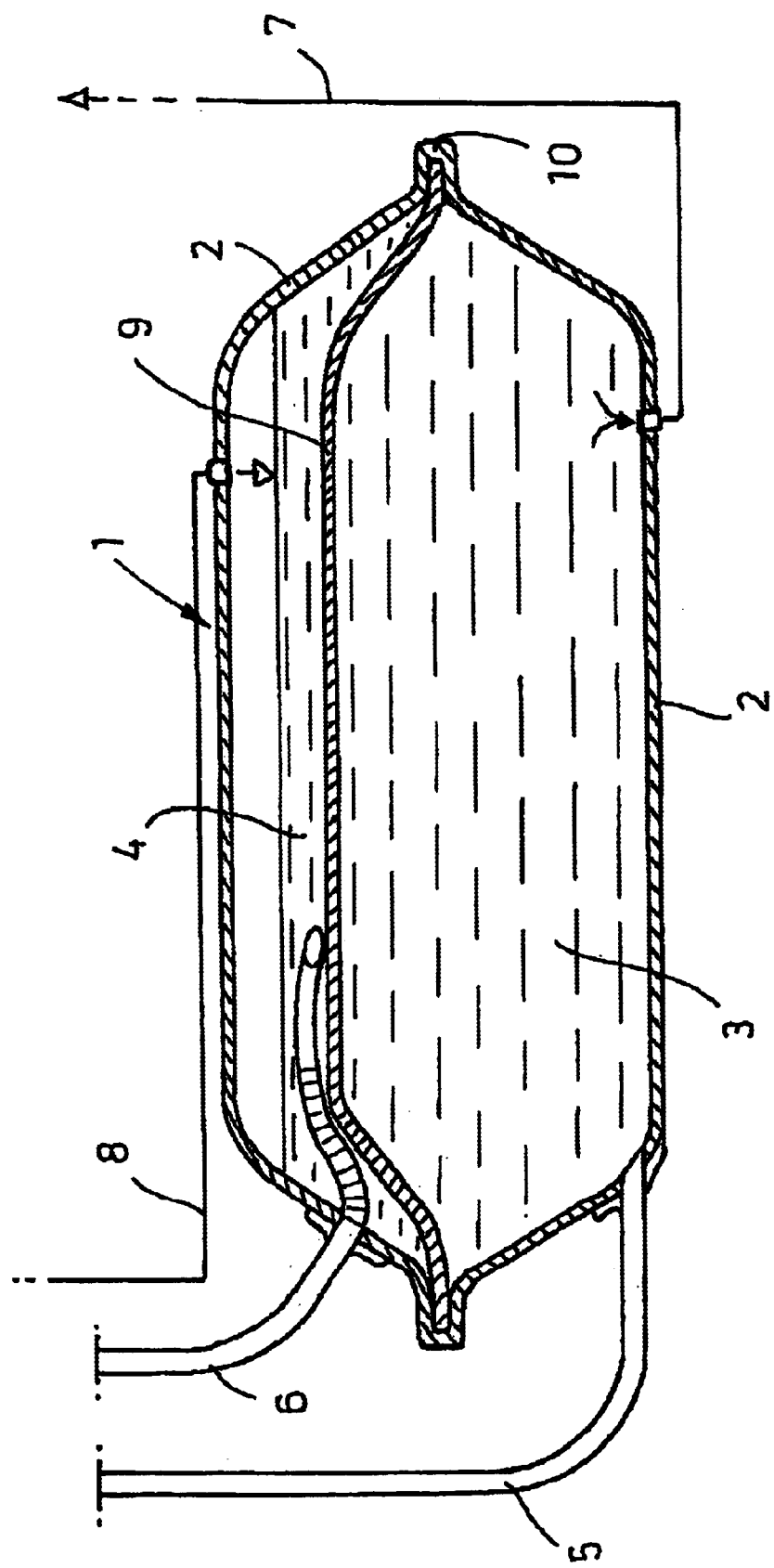
FIG. 3 is a diagrammatic view of the fuel container of FIGS. 1 and 2 during operation of the vehicle in which the fuel container is fitted.

Reference will now be made to FIG. 3 showing the fuel container 1 during operation of the vehicle in which the fuel container is fitted. With unreacted fuel being increasingly removed from the first storage volume 3, the separating wall 9 moves downwardly in the direction of the force of gravity, and the second storage volume 4 can thus expand at the expense of the first storage volume 3 and can be correspondingly filled with the reacted fuel.

As hydrogen can also be liberated without a catalytic reaction by virtue of surge and swirl movements both of the reacted fuel and also the unreacted fuel, a venting system will generally be provided for both storage volumes 3 and 4 although the venting system is not Illustrated here.

Figure 4:
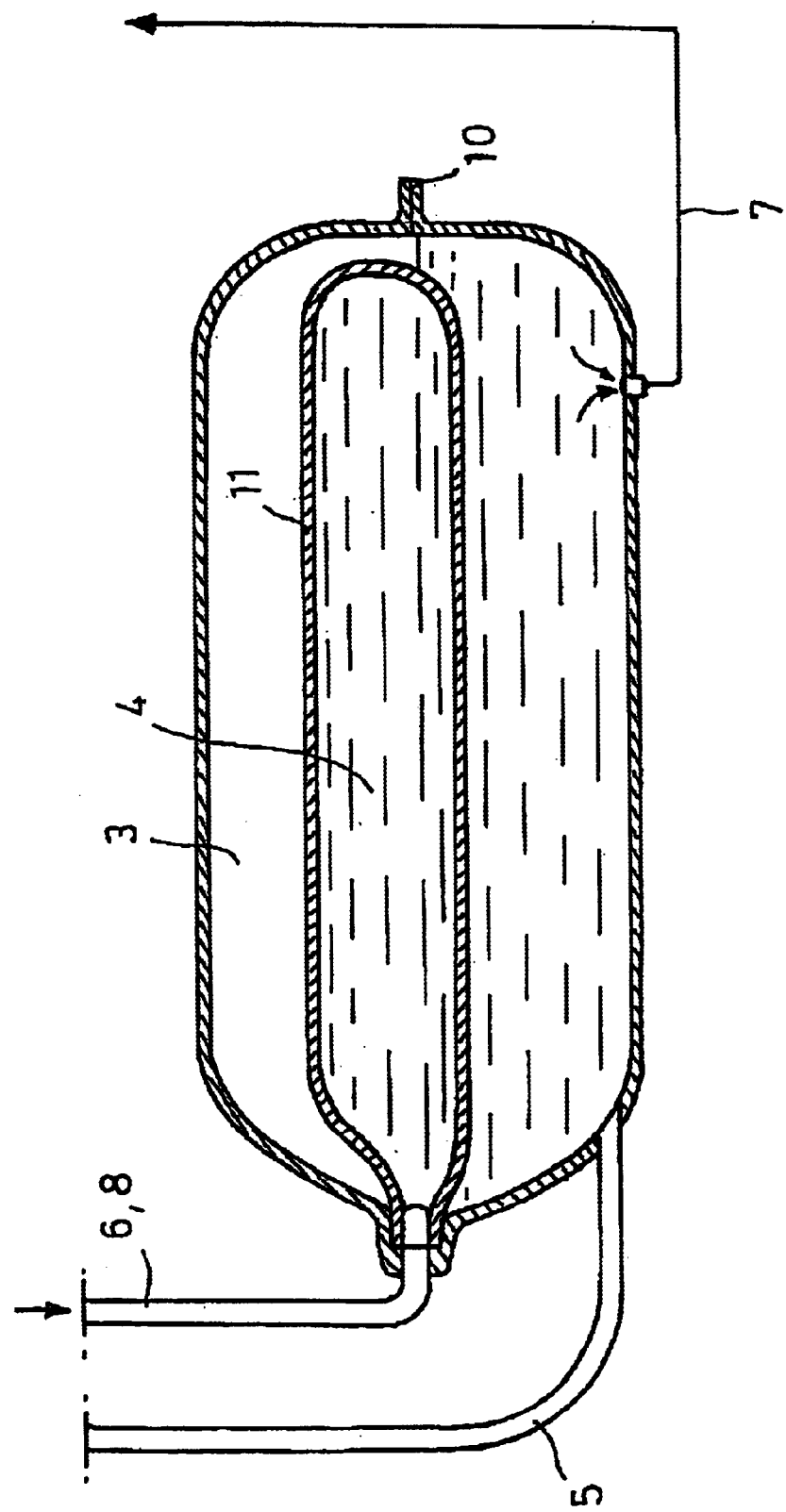
FIG. 4 is a diagrammatic view of a second embodiment of a fuel container according to the invention.

Attention is now directed to FIG. 4 showing a second embodiment of a fuel container in accordance with the invention. Here, the same components are denoted by the same references as used hereinbefore in relation to FIGS. 1 through 3.

In this embodiment, within the fuel container 1, a second storage volume 4 for receiving the reacted fuel is formed by a flexible inner container 11 which can be for example in the form of a bag consisting for example of a suitable film or foil material. The volume of the fuel container 1, which is identified as the first storage volume 3, is in this case the primary volume of the fuel container 1. The flexible container 11 can expand at the expense of the primary volume of the fuel container 1 when the latter is emptied. In the case of the embodiment shown in FIG. 4 the emptying conduit 6 at the same time performs the function of the return conduit identified by reference numeral 8 in the embodiment shown in FIGS. 1 through 3. In other words, the feed of reacted fuel and emptying thereof from the storage volume 4 are effected through a single conduit combining the functions of the conduits 6 and 8 in FIGS. 1 through 3.

Reference will now be made to FIGS. 5 through 10 showing an embodiment of a fuel container arrangement which is at the present time a preferred configuration of this arrangement.

The illustrated fuel container arrangement substantially comprises a container 12 from which unreacted fuel is taken, being referred to herein for the sake of convenience and brevity as the removal container, first, second and third storage containers 13a, 13b and 13c and a collecting container 14, which are connected in series and communicate with each other.

Figure 5:
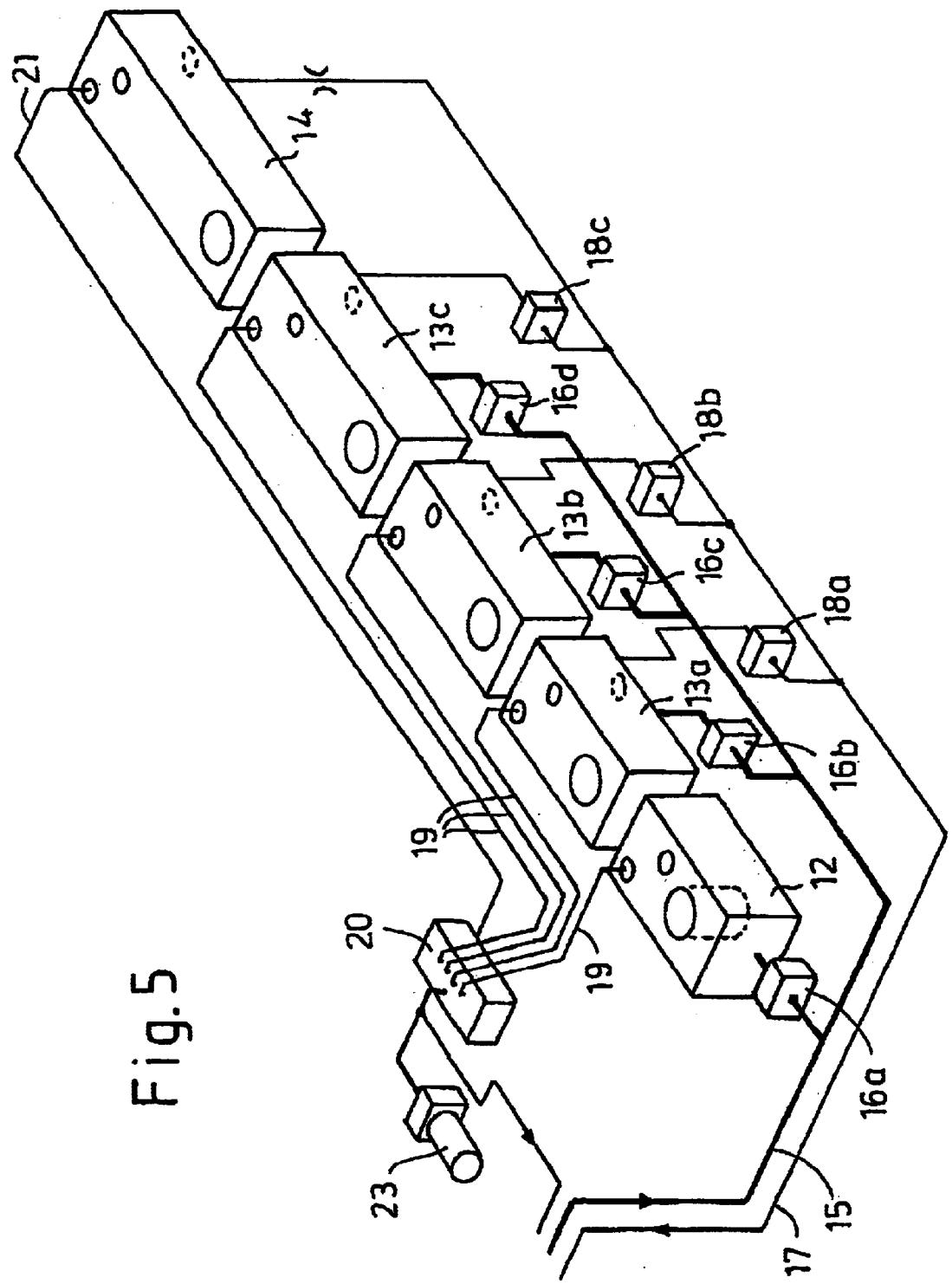
FIG. 5 is a diagrammatic view of a fuel container arrangement according to the invention, with only filling, emptying and venting conduits being shown for the sake of simplicity.
Figure 6:
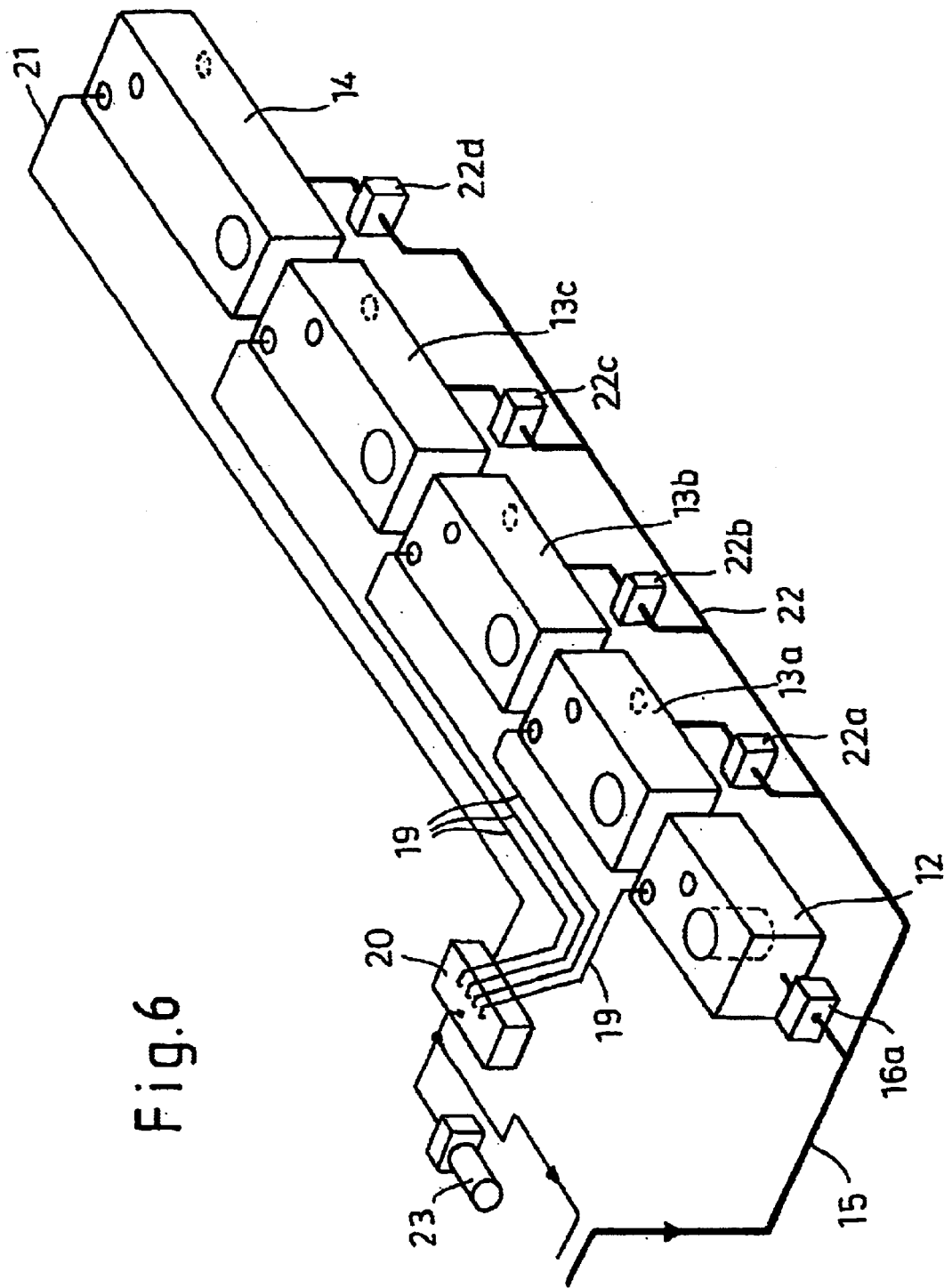
FIG. 6 is a diagrammatic view of a fuel container arrangement according to the invention in which only one single conduit is provided for filling and emptying purposes.

Looking firstly at FIGS. 5 and 6, shown therein are diagrammatic views of the fuel container arrangement in relation to filling, emptying and venting procedures. By way of a filling conduit indicated at 15, when filling the fuel container of the vehicle with fuel, the removal container 12 and the storage containers 13a, 13b and 13c are filled with unreacted fuel, that is to say for example an aqueous solution with 30% sodium borohydride. The containers 12, 13a, 13b and 13c are each connected by way of a respective filling valve 16a, 16b, 16c and 16d to the common filling conduit 15 so that those containers 12, 13a, 13b and 13c can be filled with fuel successively, by way of suitable switching of the filling valves 16a through 16d. That could take place for example in such a way that firstly the removal container 12 is filled, with the filling valve 16a open, whereas the filling valves 16b, 16c and 16d are closed. When the removal container 12 is full the filling valve 16a can close and the filling valve 16b can open. Alternatively, at the beginning of the refuelling procedure, all filling valves 16a through 16d can be open. The valves then successively close in accordance with the respective filling condition of one or other of the containers 12, 13a, 13b, 13c, in which case the pressure of liquid in the filling conduit 15 rises due to the last closing filling valve and that causes the automatic shut-off valve in the refuelling nozzle to close. As already mentioned hereinbefore, firstly only the removal container 12 and the storage containers 13a, 13b and 13c are filled. The collecting container 14 must be available immediately after termination of the refuelling procedure for receiving unreacted fuel and therefore cannot be filled up. It will be apparent that the filling valves 16a, 16b, 16c and 16d are required in order to permit respective partial refuelling of the vehicle fuel container, for example if the storage container 13c is emptied and it is only that storage container 13c that is actually to be refilled, but not in contrast the containers 12, 13a and 13b.

As will be described in greater detail hereinafter, both the collecting container 14 and also the storage containers 13a, 13b and 13c may also receive reacted fuel, but the latter of course only after they have each been completely emptied. Prior to filling of the vehicle fuel container with fuel the unreacted fuel must be emptied from the collecting container 14 and possibly also from the one or more other storage containers 13a, 13b, 13c. Emptying of the collecting container 14 is necessary in order to be able to fill it again with unreacted fuel. Emptying of the storage containers 13a, 13b, 13c must be implemented in order to make the volume thereof available again for refilling with unreacted fuel.

It will be noted that herein the term 'emptying' is used to denote emptying a container for disposal in a suitable fashion of the reacted fuel whereas the term 'removal' denotes drawing off the unreacted fuel for the purposes of driving and operating the vehicle in which the fuel container is fitted. For that purpose the collecting container 14 and the storage containers 13a, 13b, and 13c are connected together by way of a common emptying conduit 17. The containers 14 and 13a through 13c are each connected by way of respective emptying valves 18a, 18b and 18c to the common emptying conduit 17.

The operation of emptying the containers 14 and 13a through 13c is effected by way of the emptying conduit 17 and the emptying valves 18a through 18c as soon as those containers are filled with the reacted fuel. It is not possible for the removal container 12 to be filled with reactive fuel as operation of the vehicle in which the fuel container arrangement is fitted must be guaranteed, until the containers are to be filled with fuel. All the containers 12, 13a through 13c and 14 are each connected by way of a respective venting conduit 19 to a bead removal container 20. Condensate can be collected in the container 20 from the venting conduits 19 and is returned by way of the conduit 21 to the collecting container 14. The gas (H₂) which is collected in the container 20 is fed to a catalyst unit 23 connected on the downstream side of the container 20.

FIG. 6 is a diagrammatic view corresponding to that shown in FIG. 5, in which the filling conduit and the emptying conduit are combined to form a common filling and emptying conduit indicated at 22, which communicates with the containers 13a, 13b, 13c and 14 by way of the filling and emptying valves 22a through 22d.

Reference will now be made to FIGS. 7 through 10 to discuss in greater detail the flow of fuel involved in various operating situations of the vehicle in which the fuel container arrangement of the invention is used.

Figure 7:
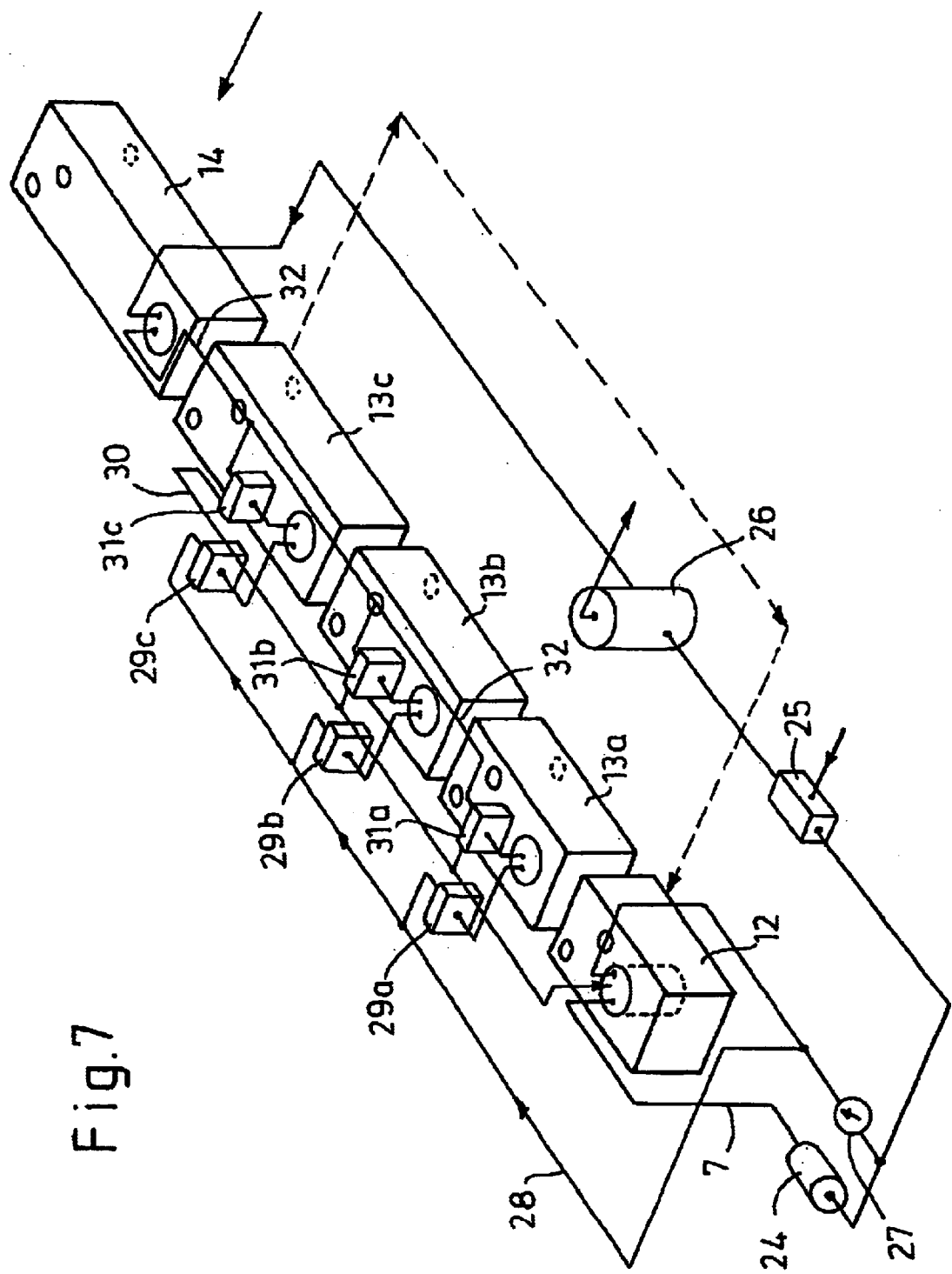
FIGS. 7 through 10 are diagrammatic views of the fuel container arrangement according to the invention, which respectively illustrate the fuel flow paths in various operating situations.
Figure 8:
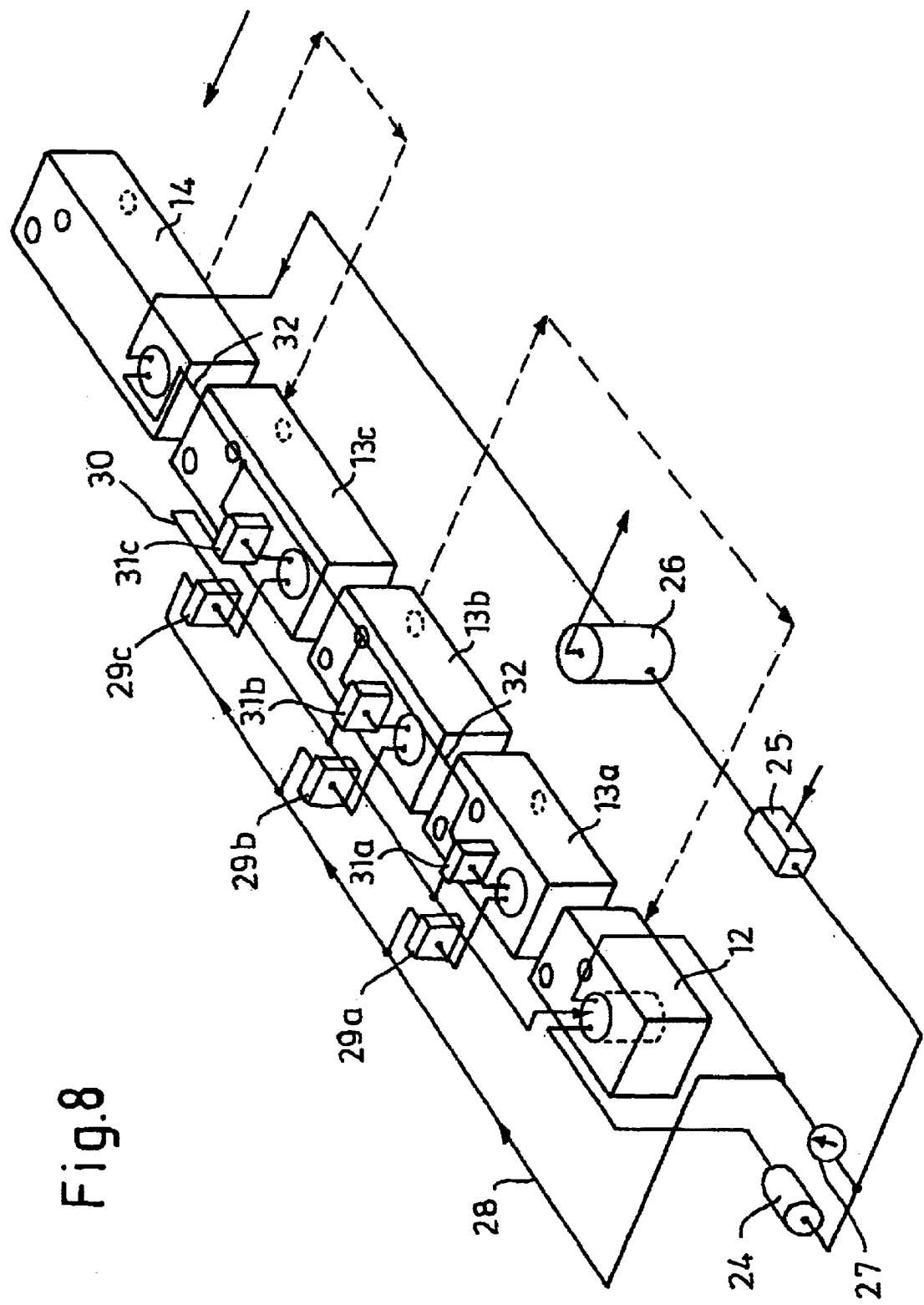

FIG. 7 shows the operating situation in which the containers 12, 13a through 13c are completely filled with unreacted fuel. Unreacted fuel is removed from the removal container 12 for the purposes of producing hydrogen and driving the vehicle in which the fuel container arrangement is fitted. As already stated hereinbefore the unreacted fuel in the form of sodium borohydride is converted into sodium borate with the liberation of hydrogen for the purposes of combustion or for the purposes of generating power in a fuel cell. The sodium borate produced in that way after the reaction is collected in a collecting container 14. The storage containers 13a through 13c are disposed between the removal container 12 and the collecting container 14. The removal container 12 is continuously fed with fuel from respective ones of the storage containers 13a through 13c. The storage containers 13a through 13c which successively become vacant are then available for receiving reacted fuel, in which case the reacted fuel is fed selectively from the collecting container 14 to the respective storage container 13a through 13c which has become vacant. That procedure is described in greater detail hereinafter.

The fuel from the removal container 12 is fed to a mixer 25 by way of the removal conduit 7, being delivered by means of a fuel pump 24. The unreacted fuel in the removal container 12 contains 30% by volume NaBH₄ in aqueous solution. In the mixer 25, the unreacted fuel is additionally diluted with water to afford a concentration of 20% by weight. As has already been indicated hereinbefore the water is condensed out of the exhaust gas from the fuel cell. From the mixer 25, the unreacted fuel passes to the catalyst unit 26 in which sodium borate (NaBO₂) is produced, with pure hydrogen (H₂) being separated off. The sodium borate in aqueous solution is passed by way of the conduit 8 to the collecting container 14. Fuel which is not used is branched off the removal conduit 7 by way of a pressure regulating valve 27 and fed back to the containers 13a through 13c again by way of a common return conduit 28. The containers 13a through 13c are connected to the return conduit 28 by way of respective return valves 29a, 29b and 29c. In the situation illustrated in FIG. 7, the return of fuel goes by way of the return conduit 28 into the storage container 13c. There, a suction jet pump (not shown) is driven by way of the return flow of fuel and feeds the removal container 12 from the storage container 13c by way of a common feed conduit 30. The storage containers 13a through 13c are each connected to the common feed conduit 30 by way of a respective feed valve 31a, 31b, 31c. The feed valves 31a through 31c also each switch a path to a respective overflow transfer conduit 32 connecting the respective containers 14, 13a through 13c.

In this case, actuation of the return and feed valves 29a through 29c and 31a through 31c is effected by way of filling level sensors (not shown) in each of the containers 14, 13a through 13c and 12 and a general control system (not shown).

The storage container 13c feeds fuel to the removal container 12 until the storage container 13c is completely emptied. The return valve 29c then closes.

Figure 9:
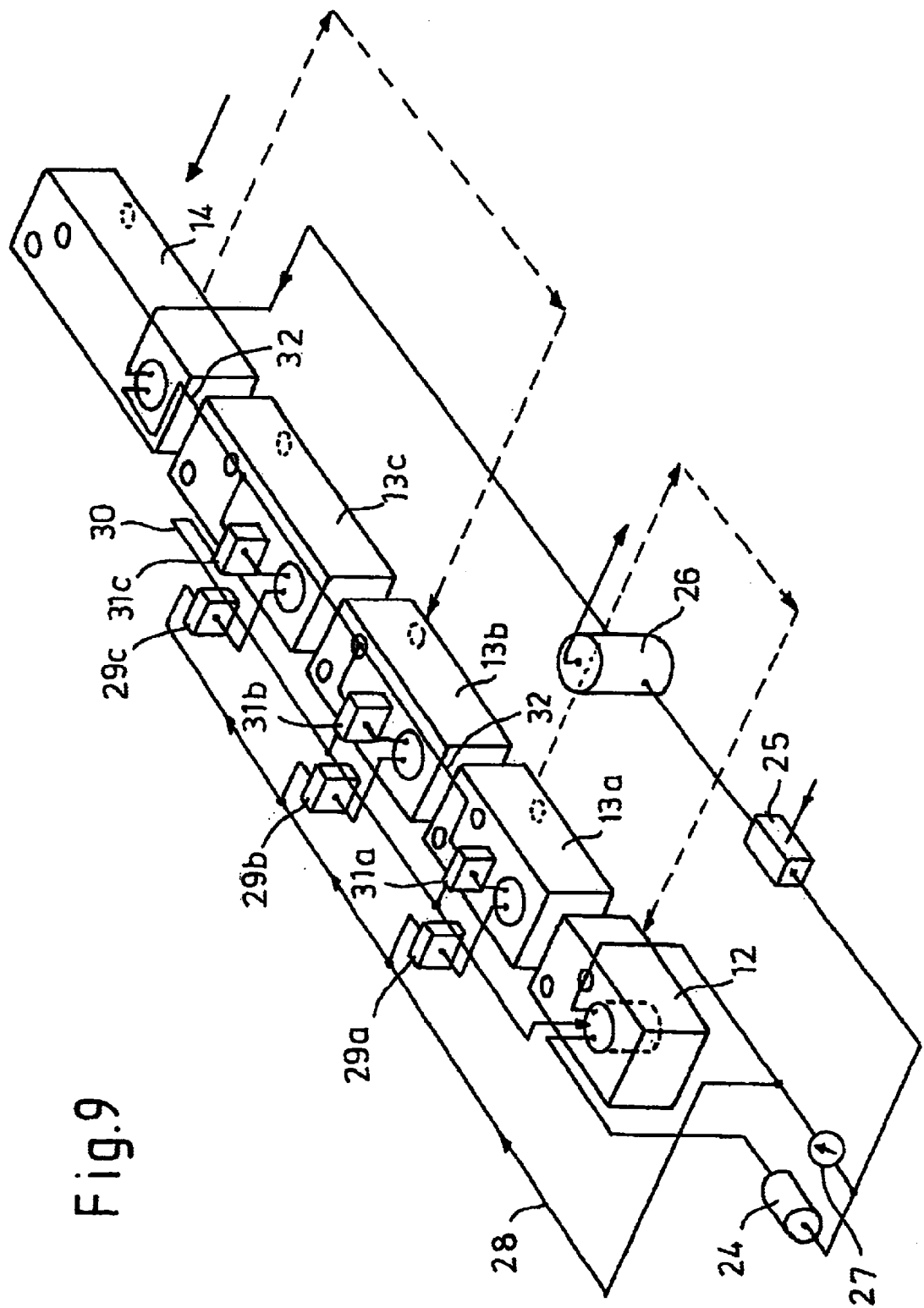

The feed valve 31c is actuated in such a way that the flow transfer conduit 32 from the collecting container 14 into the storage container 13c is opened. The communication of the storage container 13c with the feed conduit 30 is closed when the feed valve 31c is in that position. This is the situation shown in FIG. 8. There, the reacted fuel which has passed into the collecting container 14 by way of the conduit 8 can then be transferred into the storage container 13c. The fuel which is pumped by way of the return conduit 28 drives a suction jet pump which is disposed in the storage container 13b and which in turn feeds the removal container 12 by way of the feed conduit 30 until the storage container 13b is emptied. When the storage container 13b is completely emptied, that is detected by a filling level sensor (not shown) which in turn causes switching of the feed valve 31c which closes the communication with the feed conduit 30 and opens the communication with the flow transfer conduit 32. By virtue of that valve actuation procedure, reacted fuel is conveyed from the collecting container 14 into the storage container 13b, as is shown in FIG. 9. In that situation the storage container 13a feeds the removal container 12, and the reacted fuel flows by way of the flow transfer conduit 32 directly from the collecting container 14 into the storage container 13b. The feed valve 31c is completely closed so that the storage container 13c is bridged.

Figure 10:
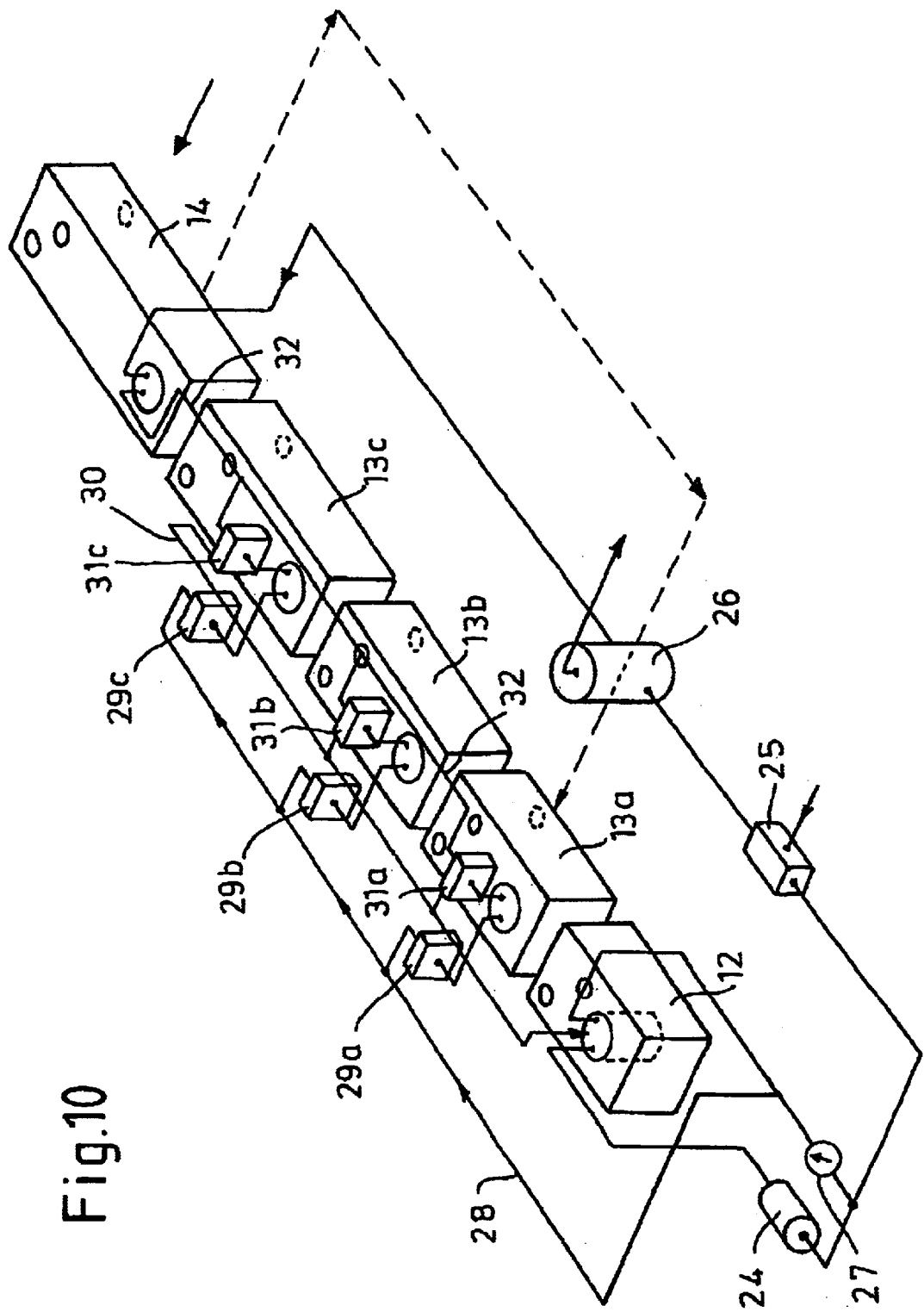

Finally, FIG. 10 shows the situation in which reacted fuel is conveyed from the collecting container 14 into the storage container 13a. The return flow of fuel from the removal container 12 takes place directly thereinto.

The fuel containers are all of mutually differing volumes. As can be seen by way of indication in the drawing, more particularly looking at FIGS. 5 through 10, the collecting container 14 is of the largest volume in the arrangement illustrated. That volume is such that the collecting container 14 can accommodate that amount of reacted fuel which results from the reaction of the volume of fuel contained in the storage container 13c. The storage container 13c in turn is of such a size that it can accommodate that amount of reacted fuel which results from the reaction of the volume of fuel in the container 13b. The fuel container 13b in turn is of such a volume that it can receive that amount of reacted fuel which results from the volume of the fuel container 13a and finally the volume of the fuel container 13a is such that it can accommodate that amount of reacted fuel which arises from complete reaction of the volume of fuel in the removal container 12.

Preferably, the removal container 12 and the storage containers 13a through 13c are made of plastic material. As the reacted fuel, after passing through the catalyst unit 26, is at a comparatively high temperature which has to be eliminated the collecting container 14 is preferably made of metal. It will be appreciated that such a container can better remove the heat involved than a plastic container. It may be noted however that the collecting container 14 may also comprise plastic material if the returned reacted fuel were also lowered in temperature to a level compatible with the plastic material, for example by means of a suitable cooling apparatus.

It will be appreciated that the above-described method and apparatus structure in accordance with the principles of the invention have been set forth solely by way of example and illustration of the invention and that various other modifications and alterations may be made therein without thereby departing from the spirit and scope of the invention.

What is claimed is:

1. A method of supplying fuel for a vehicle comprising at least one hydrogen consumer in which hydrogen is converted into electrical energy, wherein the hydrogen is liberated by catalytic reaction of a hydrogen donor provided as the fuel and recyclable fuel which has reacted in that operation is produced, including taking unreacted fuel from a first storage volume, filling at least one second storage volume separate from the first storage volume with reacted fuel and at least partially additionally using the first storage volume which has become vacant by virtue of unreacted fuel being taken therefrom, for storage of the reacted fuel.

2. A method as set forth in claim 1 including the use of a plurality of mutually spatially separated containers as storage volumes.

3. A method as set forth in claim 1 including the use of at least three series-connected containers as storage volumes, wherein the unreacted fuel is taken from at least one storage container by way of a removal container which is fed with the unreacted fuel from said at least one storage container, at least one collecting container is filled with reacted fuel and reacted fuel is transferred from the collecting container into the at least one storage container when the unreacted fuel has been completely taken therefrom.

4. A fuel container for supplying fuel for vehicle comprising at least one hydrogen consumer in which hydrogen is converted into electrical energy, wherein the hydrogen is liberated by catalytic reaction of a hydrogen donor provided as the fuel and recyclable fuel which has reacted in that operation is produced, including first and second mutually separate volumes for reacted and unreacted fuel, means dividing the first and second volumes from each other and adapted to permit variation in the size of the respective volumes such that upon filling of one said volume said one volume is expandable at the expense of the respective other volume, at least one container filling and/or emptying opening, and at least one removal conduit for the removal of fuel from the container.

5. A fuel container as set forth in claim 4 including first and second chambers, wherein said dividing means comprises a flexible wall separating the chambers from each other.

6. A fuel container as set forth in claim 5 including a peripherally extending container seam, wherein said flexible wall is clamped peripherally in fluid-tight and gas-tight relationship in the region of said seam.

7. A fuel container as set forth in claim 4 wherein the container includes an outer casing means defining a main volume and a flexible inner container having a volume which is fluid-tightly and gas-tightly separated from the main volume and which is variable at the expense of the main volume.

8. A fuel container arrangement for supplying fuel for a motor vehicle comprising at least one hydrogen consumer in which hydrogen is converted into electrical energy, wherein the hydrogen is liberated by catalytic reaction of a hydrogen donor provided as the fuel and recyclable fuel which has reacted in that operation is produced, including at least one removal container for the removal of fuel from the arrangement, at least one storage container for storing unreacted fuel, means communicating the removal container and the storage container, means for conveying fuel from the storage container into the removal container, at least one collecting container for collecting reacted fuel, and a flow transfer means communicating said at least one collecting container with a storage container.

9. A fuel container arrangement as set forth in claim 8 including a switchable multiway valve operable for connecting the storage container to the removal container and to the collecting container.

10. A fuel container arrangement as set forth in claim 8 including at least two further storage containers and switchable valve means for respectively communicating the at least two further storage containers with the removal container and the collecting container.

11. A fuel container arrangement as set forth in claim 8 including suction jet pumps for respectively feeding the removal container from said storage containers, and a return conduit from said removal container for supplying fuel for actuating each respective suction jet pump.

12. A fuel container arrangement as set forth in claim 11 including a removal conduit for taking fuel from the removal container, wherein the return conduit is branched from said removal conduit.

13. A fuel container arrangement as set forth in claim 11 including a common feed conduit to the removal container, and means communicating the storage containers with a common return conduit from the removal container and said common feed conduit to the removal container.

14. A fuel container arrangement as set forth in claim 12 including a pressure regulating valve communicating the return conduit with the removal conduit.

15. A fuel container arrangement as set forth in claim 8 including a plurality of storage containers connected in series for fuel conveyance successively thereto, wherein the size of the collecting container and the storage containers is respectively such that the container which is respectively disposed upstream in the direction of fuel conveyance is capable of receiving the volume of reacted fuel which is produced upon emptying of the downstream-connected container with unreacted fuel and processing thereof.

16. A fuel container arrangement as set forth in claim 9 including a plurality of storage containers, a common filling conduit, and means connecting the removal container and the storage containers to the common filling conduit.

17. A fuel container arrangement as set forth in claim 9 including a plurality of storage containers, a common emptying conduit, and means connecting the removal container and the storage containers to the common emptying conduit.

* * * * *